United States Patent [19]

Martin

[11] 4,306,702
[45] Dec. 22, 1981

[54] BRACKET MOUNTING

[76] Inventor: Jack T. Martin, 85 Leonard Ave., Washington, Pa. 15301

[21] Appl. No.: 210,285

[22] Filed: Nov. 26, 1980

[51] Int. Cl.³ .......................................... F16M 13/00
[52] U.S. Cl. .................................. 248/546; 248/217.1; 248/217.2
[58] Field of Search ................... 248/205 R, 304, 308, 248/217.1, 217.2, 216.1, 71, 220.1, 546

[56] References Cited

U.S. PATENT DOCUMENTS

| 160,754 | 3/1875 | Dobbs et al. | 248/217.2 X |
| 644,985 | 3/1900 | Lawton | 248/217.1 |
| 684,312 | 10/1901 | Rush | 248/216.1 |
| 707,824 | 8/1902 | Cobb | 248/217.1 X |
| 713,156 | 11/1902 | Saberhagen | 248/217.1 |
| 780,205 | 1/1905 | Laney | 248/217.1 X |

FOREIGN PATENT DOCUMENTS 46898 2/1933 Denmark .......................... 248/217.2

Primary Examiner—J. Franklin Foss
Attorney, Agent, or Firm—William J. Ruano

[57] ABSTRACT

A bracket having mounting means integrally formed or fastened thereon in the form of a pair of sharp projections extending upwardly from a vertical support arm for piercing into the surface of the ceiling or any projection where it joins a side wall and having, projecting from the lower portion of the support arm, a horizontal sharp projection for piercing a side wall, merely by manual pressure, or by the tap of a small object. The weight of any object, such a plant supported by the bracket, will cause the horizontal projection to bite even more deeply into the side wall and will be resisted by the lateral support in the ceiling or projection provided by the two vertical sharp projections.

1 Claim, 3 Drawing Figures

BRACKET MOUNTING

This invention relates to a bracket contraction or, more particularly, to an integral mounting means thereon.

An outstanding disadvantage of brackets and the like in common use is that they require separate fastening elements, such as screws, anchors, bolts and the like for mounting on a wall requiring special tools which are often not readily available or familiar to leasees of apartments and the like or those who are not mechanically knowledgeable.

An object of the present invention is to overcome the above-named disadvantages of presently used brackets by providing a novel bracket with integral fastening means to enable mounting of the bracket with no tools, or, at most, with a light hammer or tapping object, such as a shoe heel, etc.

A more specific object of the invention is to provide a bracket with sharp projections for piercing into the ceiling and side wall when the bracket is mounted at the jointure of the ceiling and side wall with minimal marring or damage.

Other objects and advantages of the invention will become more apparent from a study of the following description taken with the accompanying drawings wherein.

Figure 1:
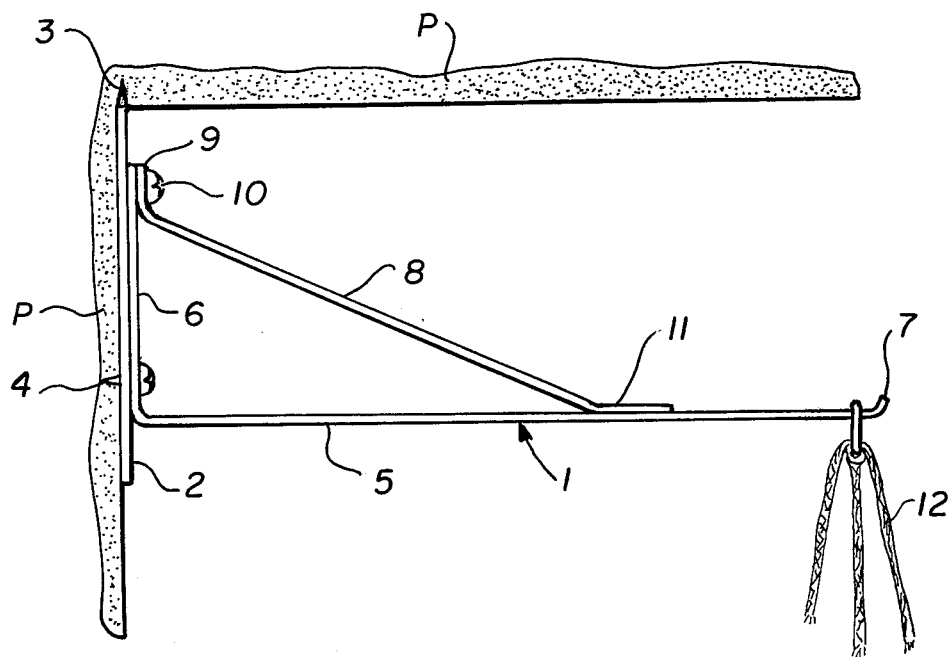
FIG. 1 is a side or elevational view of a bracket embodying mounting means according to the principles of the present invention.
Figure 2:
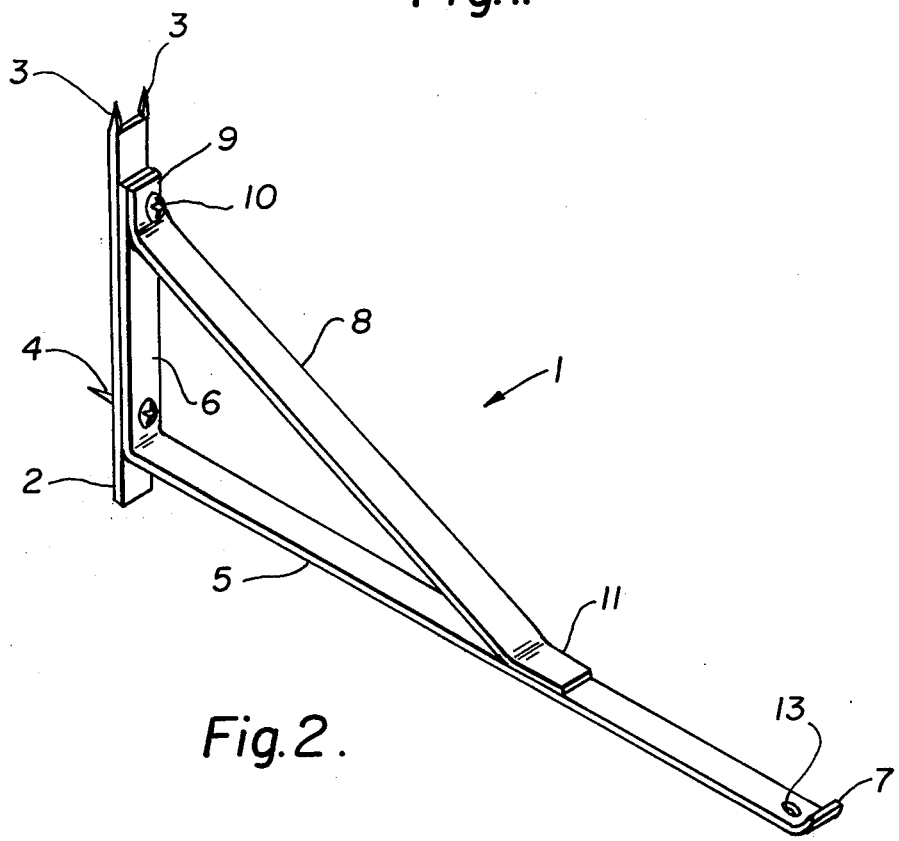
FIG. 2 is a perspective view thereof, separate from the ceiling or side wall.

Referring more particularly to the drawing, P denotes the surface portion, such as the plastered portion of a side wall and ceiling of the room of a house or any other building.

Numeral 1 generally denotes a bracket having a vertical support portion 2 and lateral frame portions 5, 6 and 8 integrally secured at 9, 10, 11, by bolting, welding or crimping for suspending objects such as a flower plant at upturned end portion 7, supported by cords 12.

The bracket vertical support arm 2 is adapted to rest against the surface of the side wall and at the top of which there is provided a pair of sharp tooth-like projections 3 extending vertically upwardly therefrom and adapted to pierce the other surface material of the ceiling or projection, such as plaster, accoustic-like material, wood or similar other, relatively soft surface materials found in ceiling, ledges, shelves, molding, etc. A similar tooth element 4 projects horizontally and rearwardly from the support arm 2 so as to pierce the surface P of the side wall. In some instances, it may be more desirable to locate element 4 below frame portion 5 on arm 2 to facilitate securing. Tooth elements 3 and 4 may also be welded or screw fastened to vertical support arm 2 or other vertical part of bracket 1.

In operation, in order to mount the bracket it is necessary merely to press upwardly on the bracket 1, if the ceiling material P is comparatively soft, or to tap the bottom of the support arm 2 in an upward direction so that the teeth 3 sink into the surface material P of the ceiling. Thereafter, the support element arm 2 is pushed horizontally against the side wall by grasping the outer extremity of the bracket for leverage until tooth 4 pierces the outer surface P thereof, assuming that it is of comparatively soft material. If not, the support arm 2 is tapped horizontally until tooth 4 sinks into the outer surface P of the side wall to provide vertical support to the bracket. If desired, two or more teeth may be used instead of the single tooth 4, also, more than two teeth may be used for projections 3.

When an object to be carried by the bracket, such as a plant, is suspended therefrom by cords 12, it creates a moment arm in a downward direction which tends to hold the horizontal tooth 4 more firmly in the side wall to assure a secure mounting. It will also provide friction between the vertical teeth 3 and the ceiling material P to hold it in the mounted position.

Figure 3:
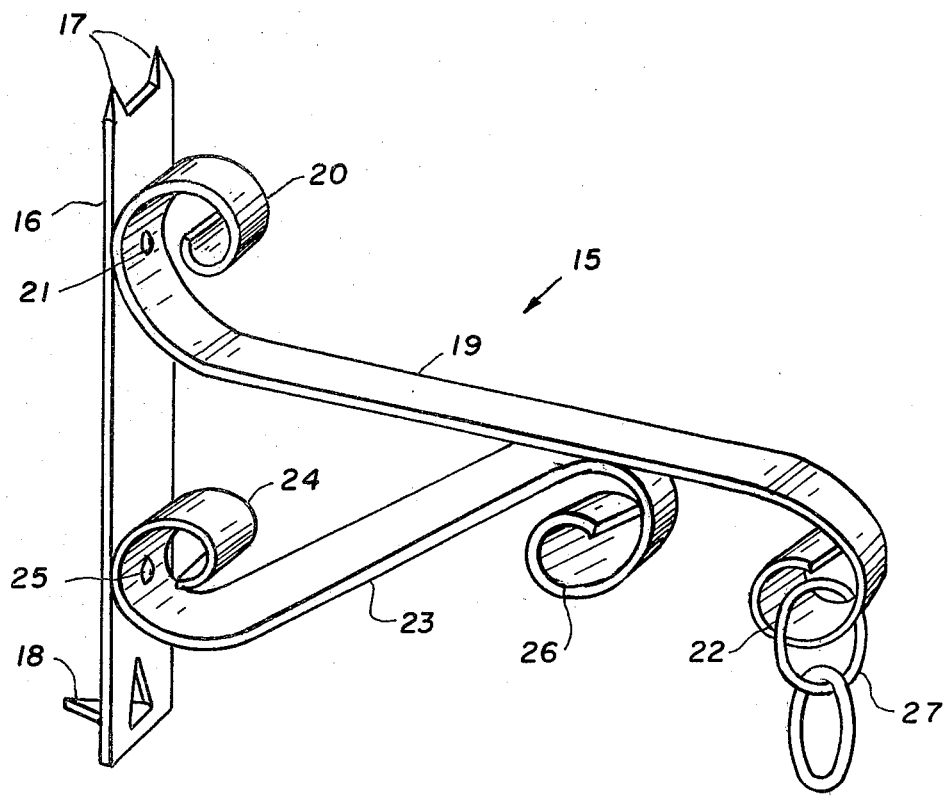
FIG. 3 is a side or elevational view of a modification.

FIG. 3 shows a modification of the bracket generally denoted as 15 having a vertical support arm 16 terminating at its upper end in a pair of teeth 17 and adjacent its lower end with a tooth 18 (or a pair of them) which teeth are driven into the ceiling and side wall portion, for example, of the room.

The bracket comprises also laterally extending arms 19 and 23 which preferably terminate in upwardly curved end portions 20 and 24 respectively, which end portions are welded or otherwise rigidly secured at 21 and 25, respectively, to support arm 16. The outer extremity of arm 19 is preferably curved at 22 to form an eye for supporting any suspended object carried by chain 27 which is attached to a flower pot (not shown) or any other suspended object. Arm 23 is welded or otherwise secured to arm 19 and curved portion 26 form a second eye for suspending a second object (not shown). In some instances, a single object may be suspended from both eyes 22 and 26.

Of course, the bracket may be of other shapes and may support any types of objects desired to be suspended therefrom.

In all Figures, the horizontal length of the bracket is more than twice the vertical distance between the horizontal sharp projection and the pair of sharp vertical projections to enable applying a moment of force by pulling down the free end to easily drive the horizontal sharp projection into the side wall.

Thus it will be seen that I have provided a novel bracket having tooth-like mounting projections that enable the mounting of the bracket by mere pressure of the hands, that is, without tools in instances where the surface material of a ceiling and side wall are comparatively soft, and by a light tapping if such materials are relatively hard, thereby enabling easy and quick mounting of the bracket without making large holes or otherwise marring the surface of side walls or ceilings as occurs when mounting conventional brackets.

While I have described several specific embodiments of my invention, it will be understood that these are by way of illustration only and that various changes and modifications may be contemplated in the purview of my invention and within the scope of the following claims.

I claim:

1. A bracket for mounting at the jointure of a ceiling, ledge, shelf or projection and side wall of a room, comprising a bracket structure having a vertical support arm portion adapted to rest against the side wall, a pair of sharp teeth extending upwardly from the top of said vertical arm portion for penetrating said ceiling, ledge or shelf, a tooth projecting horizontally outwardly from a bottom portion of said support arm portion for penetrating a side wall, a horizontal arm portion which is over twice as long as the distance between said pair of teeth and tooth, whereby forcing said vertical arm portion upwardly said pair of teeth will pierce the outer surface of said ceiling or projection and by subsequently forcing said support arm portion horizontally by downward pulling of the free end of said horizontal arm portion, said single tooth will pierce the outer surface of said side wall, said outwardly extending are portion comprising a substantially horizontal strip having one end secured to said vertical support arm and terminating in an eye, and an angular strip having one end secured to said vertical support arm and the other end attached to an intermediate portion of said first mentioned strip and terminating in another eye so as to suspend separate objects from said eyes.

* * * * *